(12) United States Patent
Fleischmann et al.

(10) Patent No.: US 7,083,135 B2
(45) Date of Patent: Aug. 1, 2006

(54) RETRACTOR FOR A SEAT BELT

(75) Inventors: Robert Fleischmann, Neu-Ulm (DE); Jochen Benz, Sontheim (DE); Oskar Scholler, Vohringen (DE); Thomas Grasser, Illerrieden (DE); Stefan Lambrecht, Elchingen (DE)

(73) Assignee: Takata-Petri (ULM) GmbH, Ulm (DE)

( * ) Notice: Subject to any disclaimer, the term of this patent is extended or adjusted under 35 U.S.C. 154(b) by 196 days.

(21) Appl. No.: 10/787,891

(22) Filed: Feb. 27, 2004

(65) Prior Publication Data

US 2004/0195422 A1 Oct. 7, 2004

(30) Foreign Application Priority Data

Feb. 28, 2003 (DE) ................................. 103 10 020

(51) Int. Cl.
  *B65H 75/48* (2006.01)
(52) U.S. Cl. ............................ 242/382.2; 242/382.1; 242/383; 242/383.1
(58) Field of Classification Search ............ 242/382.2, 242/383, 383.1, 382.1
See application file for complete search history.

(56) References Cited

U.S. PATENT DOCUMENTS

| | | | | |
|---|---|---|---|---|
| 5,518,197 A * | 5/1996 | Gray | ........................ | 242/382.2 |
| 5,904,371 A * | 5/1999 | Koning | ........................ | 280/806 |
| 6,109,556 A * | 8/2000 | Kopetzky et al. | ........ | 242/382.2 |
| 6,340,127 B1 * | 1/2002 | Kopetzky et al. | ........ | 242/382.2 |
| 6,405,963 B1 * | 6/2002 | Specht et al. | ............ | 242/382.2 |
| 6,641,077 B1 | 11/2003 | Hanna et al. | | |

FOREIGN PATENT DOCUMENTS

DE  199 60 554 A1  3/2001

\* cited by examiner

*Primary Examiner*—Kathy Matecki
*Assistant Examiner*—Sang Kim
(74) *Attorney, Agent, or Firm*—Foley & Lardner LLP

(57) ABSTRACT

A belt retractor for a seat belt includes a belt reel, an eccentric disc connected to the belt reel, a cam disc driven by the eccentric disc, and a blocking pawl. The blocking pawl, in a blocking position, blocks a toothed ratchet wheel, and, in a release position, leaves the toothed ratchet wheel unaffected. The blocking pawl may be switched from the release position into the blocking position and conversely from the blocking position into the release position with the cam disc. For the belt retractor to be independent of tolerances, provision is made for the cam disc to have an engaging cam for engaging the blocking position of the blocking pawl and a disengaging cam for engaging the release position of the blocking pawl.

24 Claims, 16 Drawing Sheets

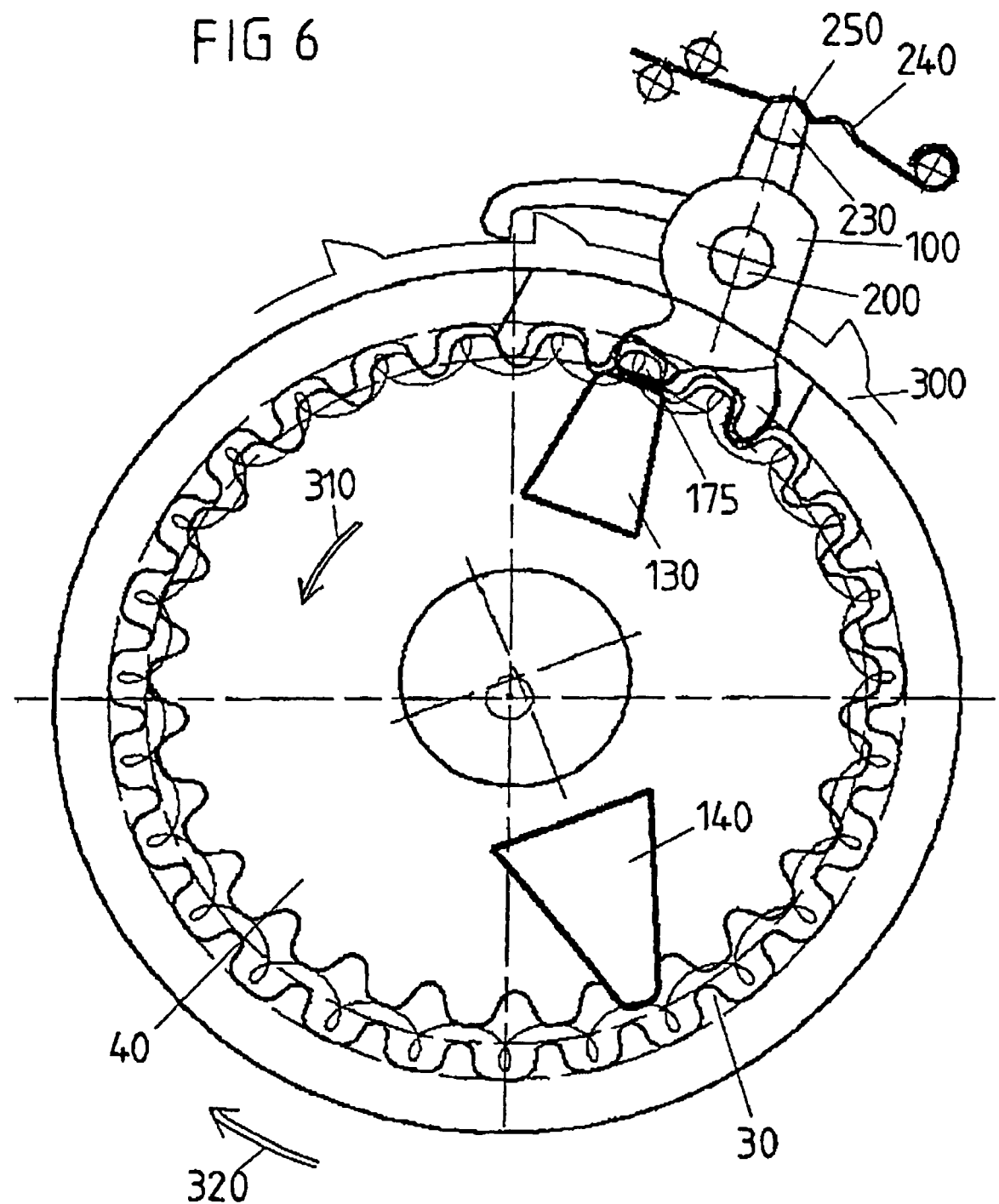

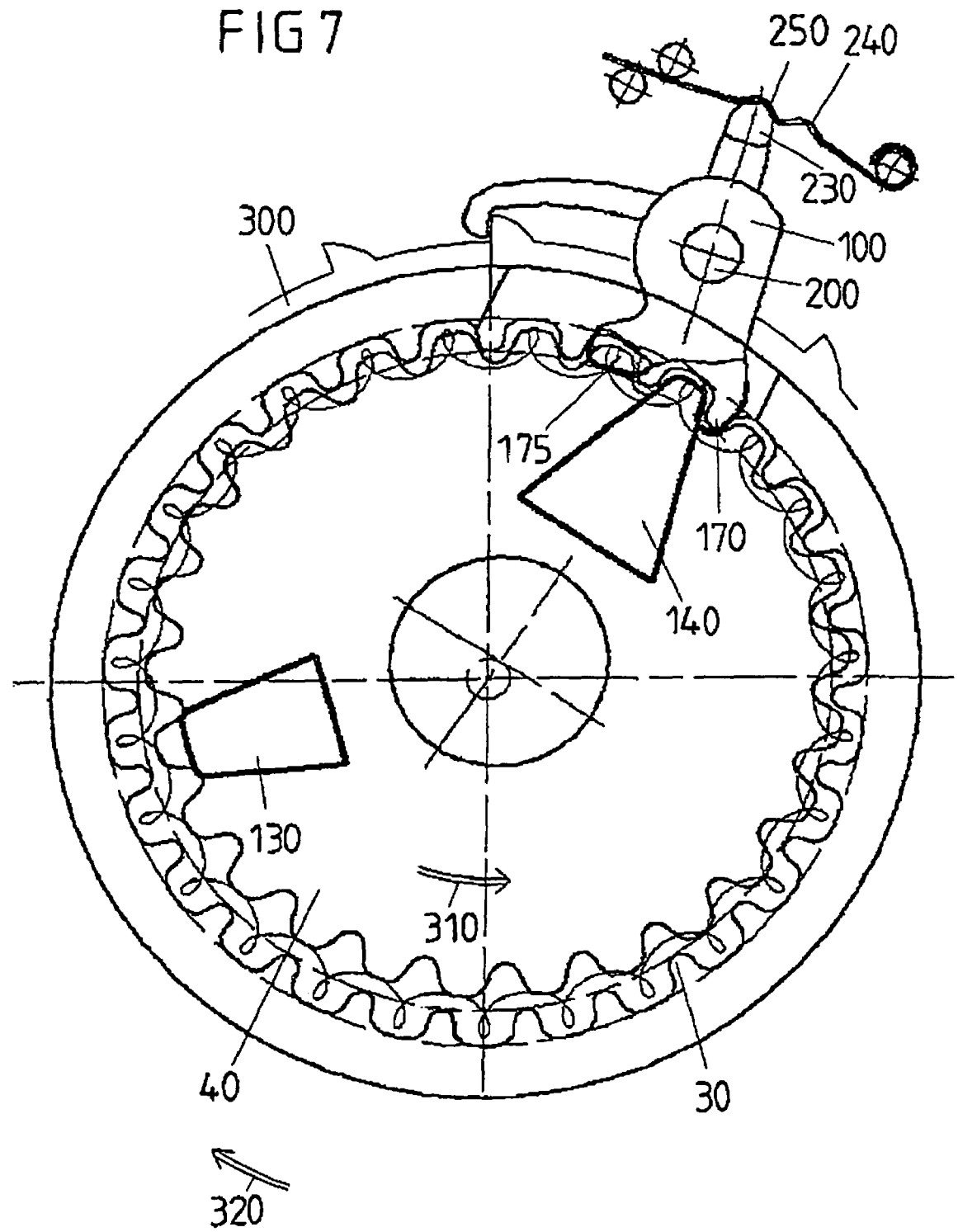

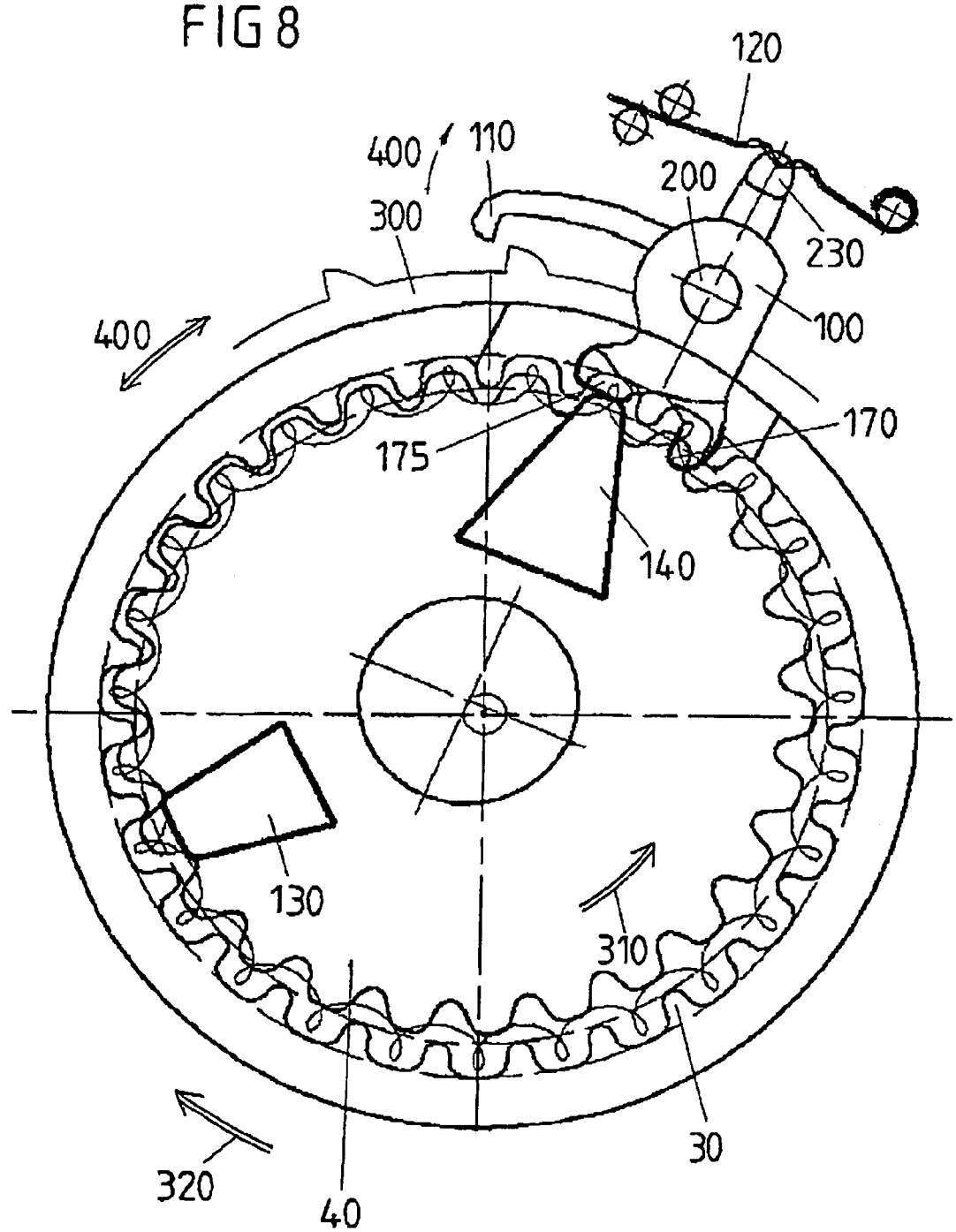

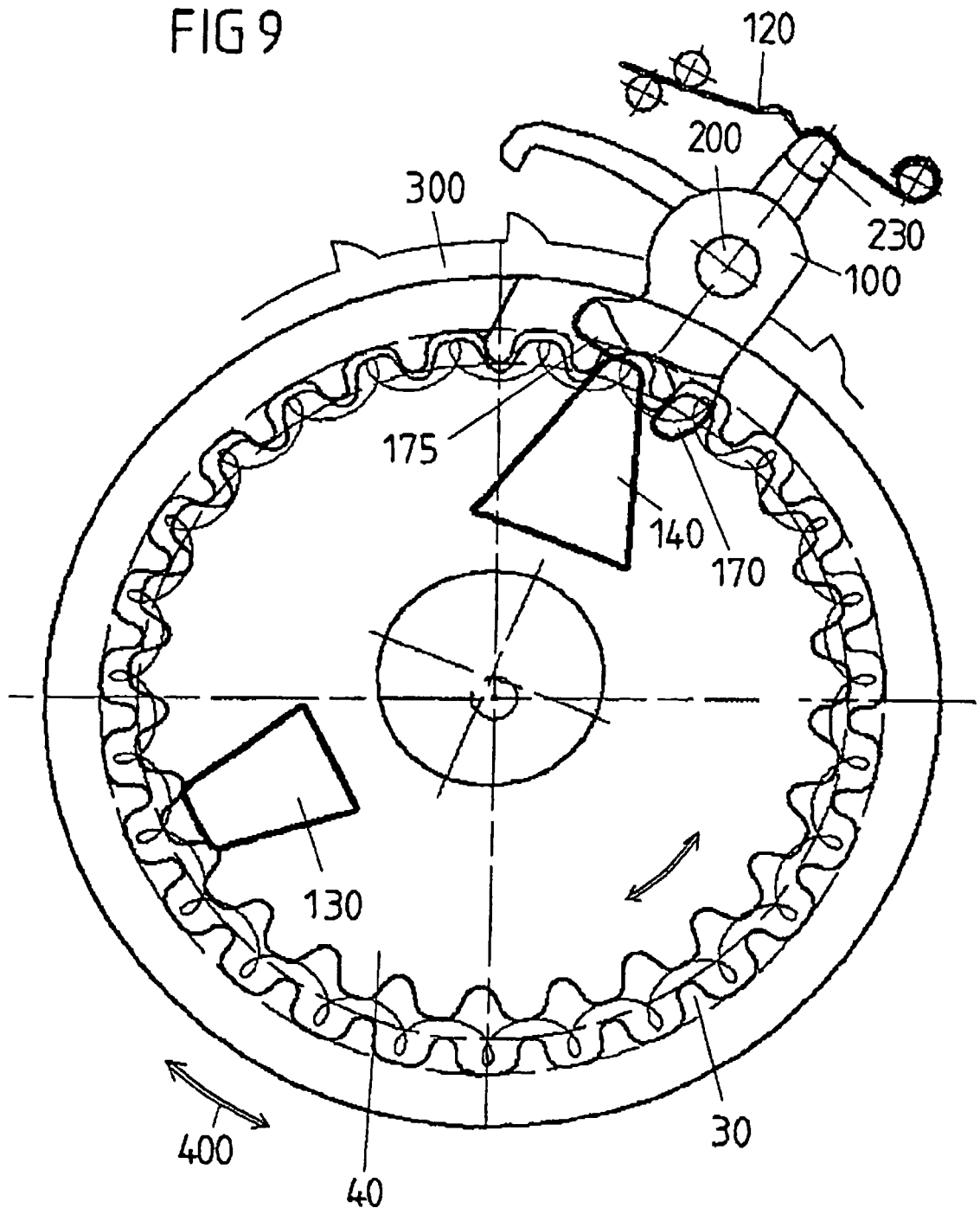

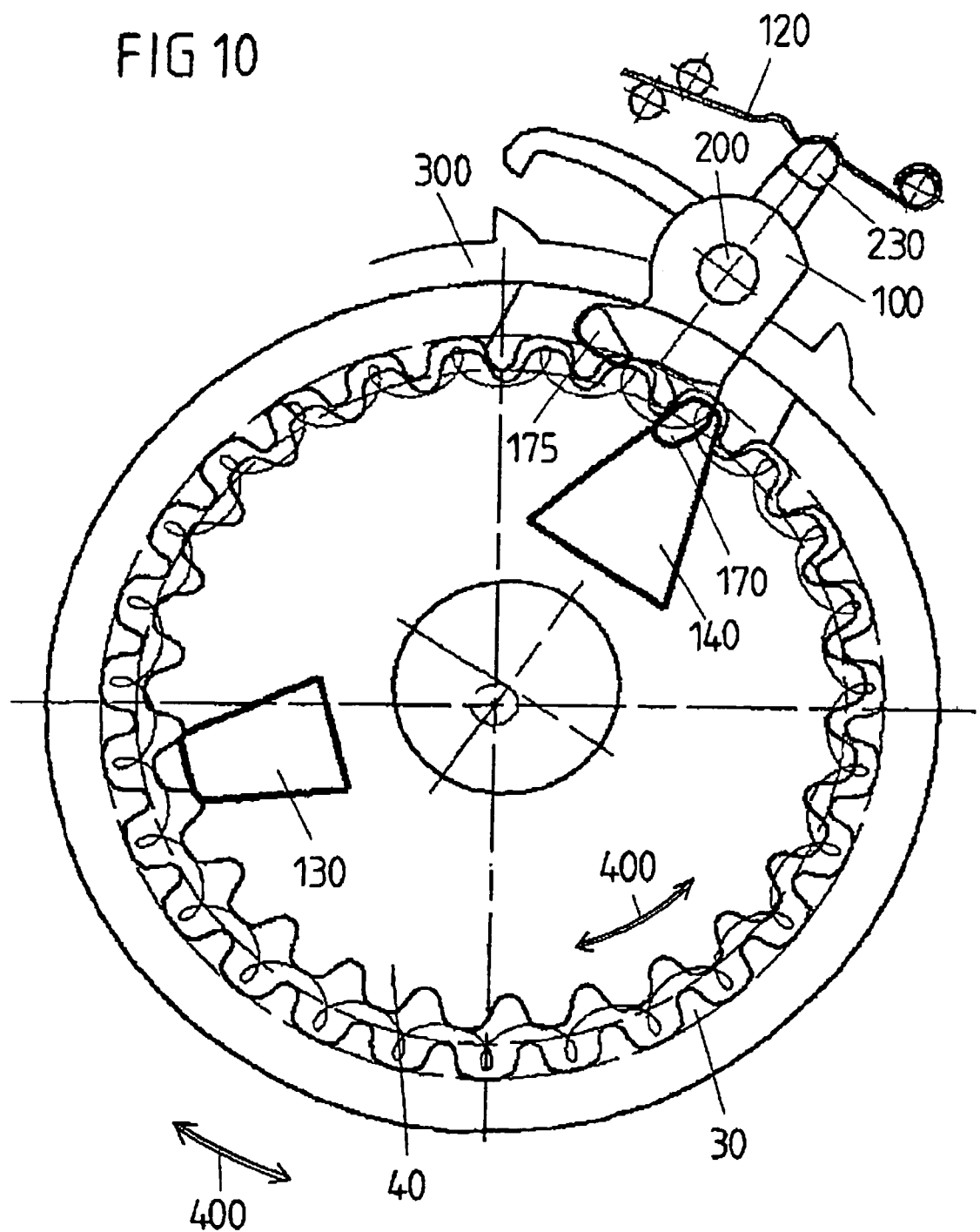

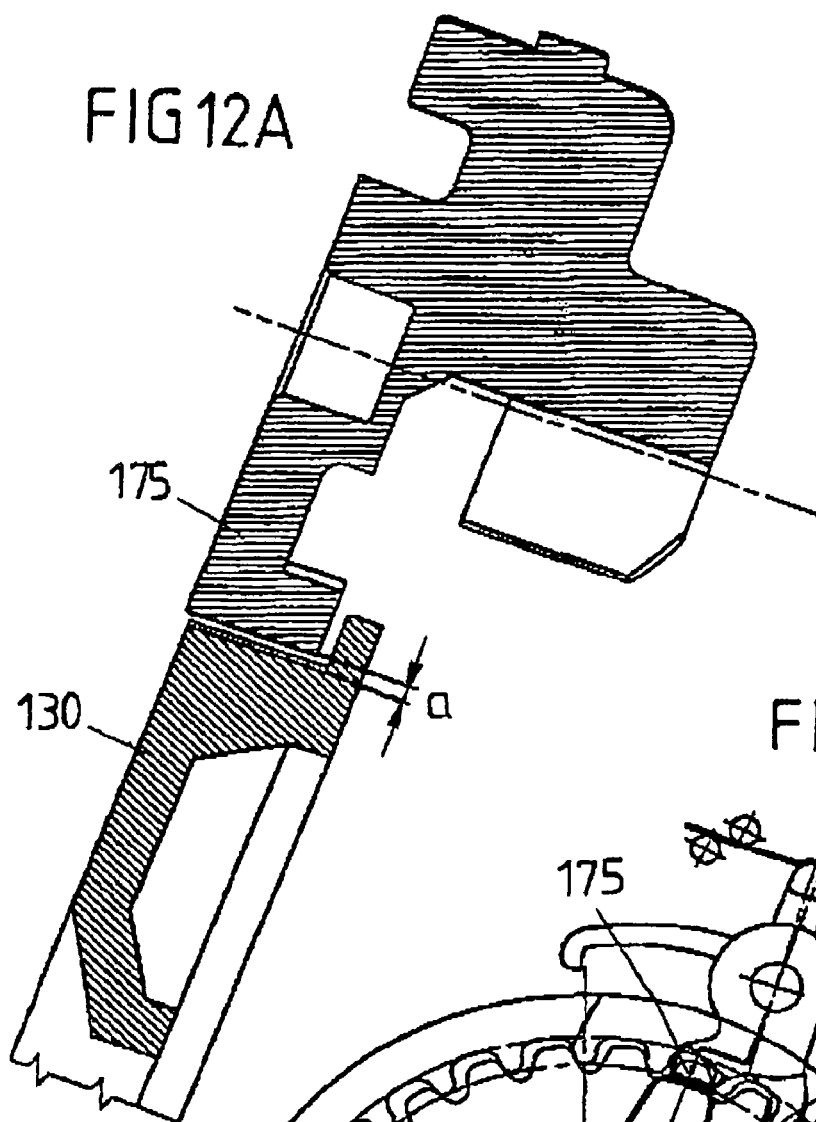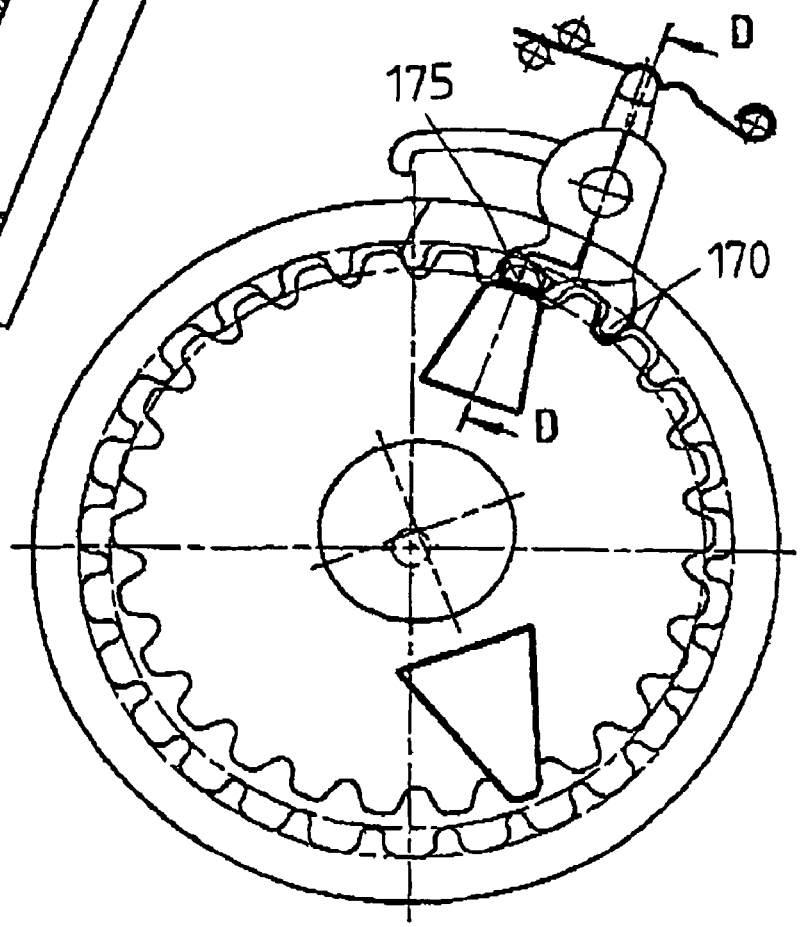

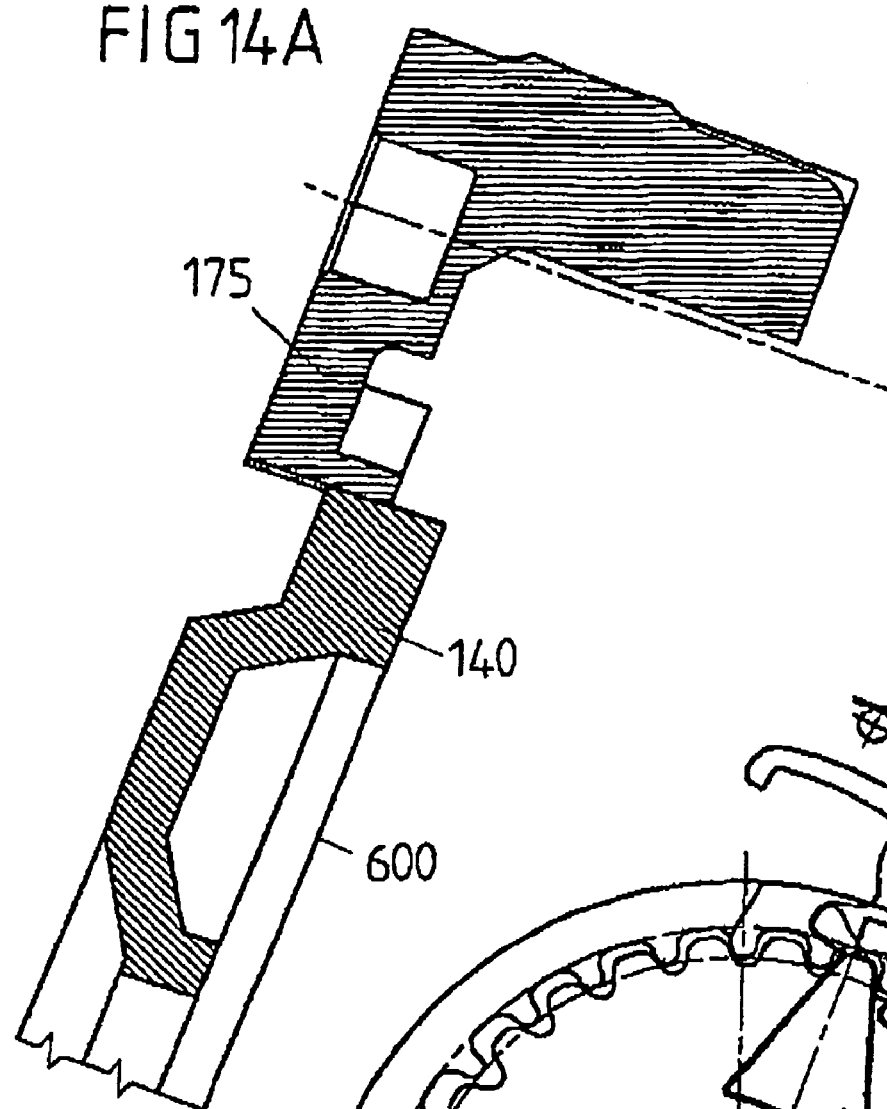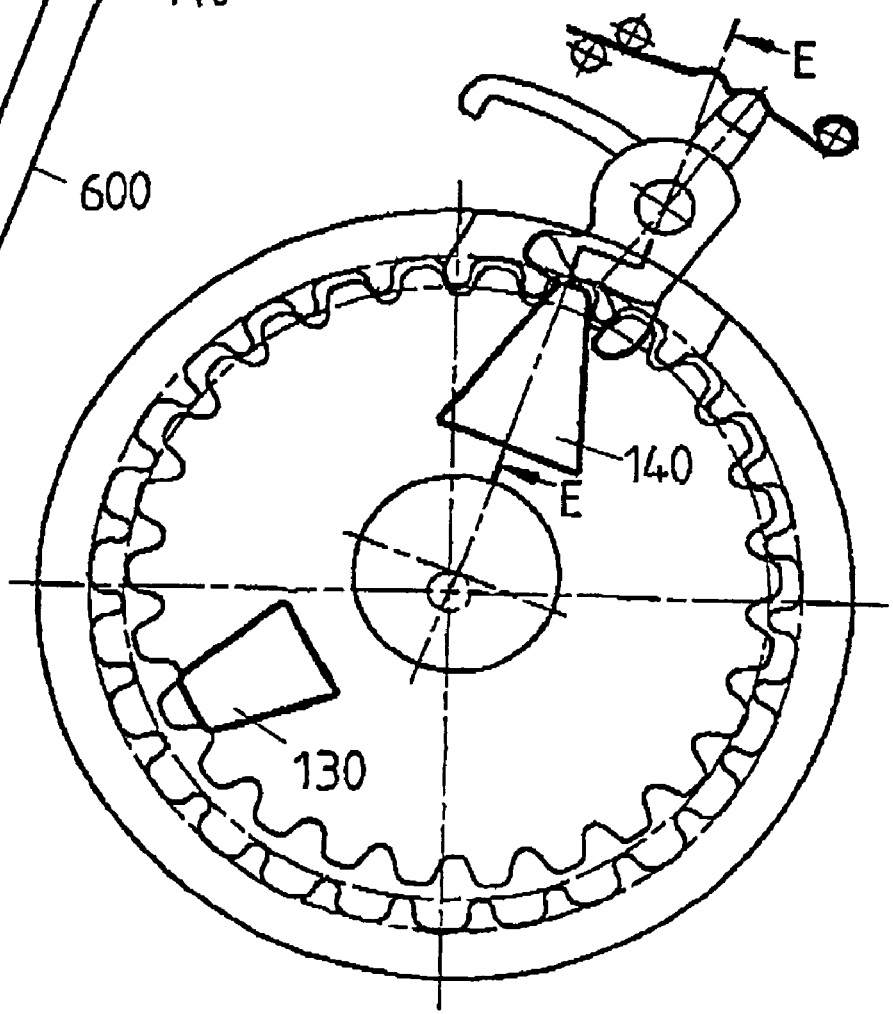

RETRACTOR FOR A SEAT BELT

BACKGROUND

The invention concerns a belt retractor for a seat belt. If, for example, a child is buckled-up with a seat belt in a motor vehicle, there is the risk of the child playfully pulling the belt out of the belt retractor during the journey and thereby extending the entire length of the belt which is available; this may have an adverse effect on the safety retaining function of the seat belt or even render it completely ineffective.

Even adults may sometimes pull the belt out during the journey farrther than is permissible for ensuring the required safety, for example to increase the comfort while traveling.

With regard to this problem, U.S. Pat. No. 5,518,197 discloses a belt retractor for a seat belt which permits an automatic locking retractor ("ALR") mode. An ALR mode is understood to be a manner of operating the belt retractor, in which, after the vehicle occupant to be secured has put on the seat belt, the seat belt is prevented from being pulled out. For this purpose, the previously known belt retractor has an eccentric disc which is connected in a rotationally fixed manner to the belt reel of the belt retractor and drives a cam disc directly. The cam disc and the eccentric disc form a wobble gear which is designed as a step-down gear.

In addition, the previously known belt retractor has a blocking pawl which, in a blocking position (i.e., in the activated state) blocks a tooth ratchet wheel (which rotates at the same time as the belt reel of the belt retractor) in the belt pull-out direction of rotation of the seat belt and, in a release position (i.e., in the inactive state) leaves the toothed ratchet wheel unaffected because it is disengaged from the toothed ratchet wheel.

In the case of the previously known belt retractor, the cam disc is configured in such a manner that it can switch the blocking pawl from the release position into the blocking position and conversely from the blocking position into the release position. If the blocking pawl is situated in its blocking position, then the previously known belt retractor is operated in the ALR mode because the blocking pawl is namely in engagement with the toothed ratchet wheel and thereby blocks the seat belt from being pulled out in the pull-out direction. If, in contrast, the blocking pawl is in its release position, then the blocking pawl and the toothed ratchet wheel are disengaged and the belt retractor can be operated in the usual manner. In this case, a usual operation of the seat belt retractor is understood to mean that, even after having been put on, the seat belt can still be pulled out as long as the pulling-out takes place relatively slowly; the usual manner of operation is also referred to as an emergency locking retractor ("ELR") mode.

In the case of the previously known belt retractor, for satisfactory functioning it is necessary for the entire length of the seat belt to be matched relatively precisely to the step-down ratio of the step-down gear; this is because only if the length of the seat belt is matched relatively precisely to the transmission ratio or step-down ratio it is ensured that, after the blocking pawl is deactivated by the cam disc, it is not re-activated unintentionally. In the case of the previously known belt retractor, the switching points are, therefore, fixedly predetermined by the step-down ratio of the step-down gear.

SUMMARY

The present invention includes as one of its objects to provide a belt retractor which permits a reliable ALR mode and is particularly independent of tolerances.

Provision is made for the cam disc to have an engaging cam for engaging the blocking position of the blocking pawl and a disengaging cam, arranged separately therefrom, for engaging the release position of the blocking pawl.

A substantial advantage of the belt retractor can be seen in the fact that, owing to the presence of two switching cams, namely an engaging cam and a disengaging cam, the length of the seat belt can be selected independently, or at least largely independently, of the step-down ratio of the step-down gear. This is because there is a separate blocking cam or engaging cam for engaging the blocking position and a separate disengaging cam for disengaging the block.

A further substantial advantage of the belt retractor can be seen in the fact that it can readily be used for different vehicles having different switching points, which are predetermined by the vehicle manufacturer, for deactivating the switching pawl without the transmission ratio of the step-down gear having to be adapted. This is because, owing to the presence of two switching cams, the switching points (depending on the predetermined vehicle specification) can be set largely independently of the transmission ratio of the step-down gear by means of an appropriate spatial arrangement of the switching cams.

An additional substantial advantage of the belt retractor resides in its simple and, therefore, cost-effective construction. This is because the cam disc is driven directly by the eccentric disc. Further or additional control discs or gear discs between the cam disc and the eccentric disc are not provided, thereby reducing material and installation costs.

Particularly reliable functioning of the belt retractor is achieved if the blocking pawl has an engaging lever which interacts exclusively with the engaging cam, and if the blocking pawl additionally has a disengaging lever which interacts exclusively with the disengaging cam of the cam disc. In this advantageous configuration of the belt retractor, it is very reliably ensured that an unintentional switching of the blocking pawl cannot occur, as the latter can only be switched by the respectively assigned switching cam of the cam disc and the respectively appropriate switching lever.

The blocking pawl can be switched from the release position into the blocking position and vice versa in a particularly simple manner, if the blocking pawl is mounted rotatably about an axis of rotation. The axis of rotation may be arranged on a housing of the belt retractor.

To lock the position of the blocking pawl (i.e., to lock it in the blocking position or to lock it in the release position), a spring with which the particular position of the blocking pawl is fixed may be provided. The spring for fixing the position of the blocking pawl may be a metal spring, for example. Instead of a metal spring, use may also be made of a plastic spring which may be formed by a plastic element that has been injection-molded, for example, onto the housing of the belt retractor.

The blocking position and the release position of the blocking pawl can be fixed in a particularly simple and, therefore, advantageous manner if the spring has two adjacent recesses, the one of which holds or fixes a latching lug of the blocking pawl in the blocking position and the other of which holds or fixes the latching lug of the blocking pawl in the release position.

Moreover, the spring may advantageously also be configured in such a manner that, when the blocking pawl is switched from the blocking position into the release position or conversely from the release position into the blocking position, the spring has to overcome a dead-center position.

It can be ensured, in a particularly simple and, therefore, advantageous manner, that the engaging lever interacts exclusively with the engaging cam and the disengaging lever interacts exclusively with the disengaging cam, if the engaging lever is dimensioned and arranged in such a manner that it cannot be touched or deflected by the disengaging cam, and if the disengaging lever is dimensioned and arranged in such a manner that it cannot be touched or deflected by the engaging cam.

Such a dimensioning and arranging of the engaging lever, the disengaging lever, the engaging cam, and the disengaging cam can be ensured in a particularly simple and, therefore, advantageous manner if one of the two switching cams is at a larger distance from the center point of the cam disc than the other of the two switching cams.

In addition, the disengaging cam and the engaging cam may be raised in comparison with the rest of the cam disc. The height of one of the two switching cams may be greater (with reference to the cam disc) than the height of the other of the two disengaging cams. In other words, the one switching cam may be raised more than the other switching cam. Further, the raised switching cam may be at a smaller distance from the center point of the cam disc than the switching cam which is raised less.

Moreover, it is regarded as advantageous if the cam disc has an outer toothed edge, the teeth of which are surrounded by an inner toothed ring which is fixed on the housing. Compared to the inner toothed ring, the outer toothed edge is of larger diameter and has complementary teeth. The cam disc is in meshing engagement with the inner toothed ring over a limited circumferential region in each case. The teeth of the outer toothed edge are at such a radial distance diametrically opposite from one another that the cam disc rolls along the inner toothed ring when the belt reel is rotated.

The inner toothed ring may have a larger number of teeth than the cam disc, to bring about a step-down of the wobble gear, which is formed by the eccentric disc, the cam disc and the inner toothed ring which is fixed on the housing. The cam disc preferably has a tooth number of $Z1=26$ and the inner toothed ring (which is fixed on the housing) has a tooth number of $Z2=27$. The transmission ratio I of the gear, therefore, turns out to be:

$$I = \frac{Z1}{Z2-Z1} = \frac{26}{27-26} = 26$$

Given such a dimensioning of the gear, a rotation of the belt reel of the belt retractor or of the eccentric disc through 360° results in a rotation of the cam disc through:

$$\frac{360°}{26} = 13.85°$$

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2–10 show the time history of the switching of a blocking pawl of a belt retractor of the type shown in FIG. 1, where FIGS. 11A, 11B, 12A, 12B, 13A, 13B, 14A, and 14B show the dimensioning of the switching cams of the cam disc and the blocking pawl of a belt retractor of the type shown in FIG. 1.

DETAILED DESCRIPTION

Figure 1:
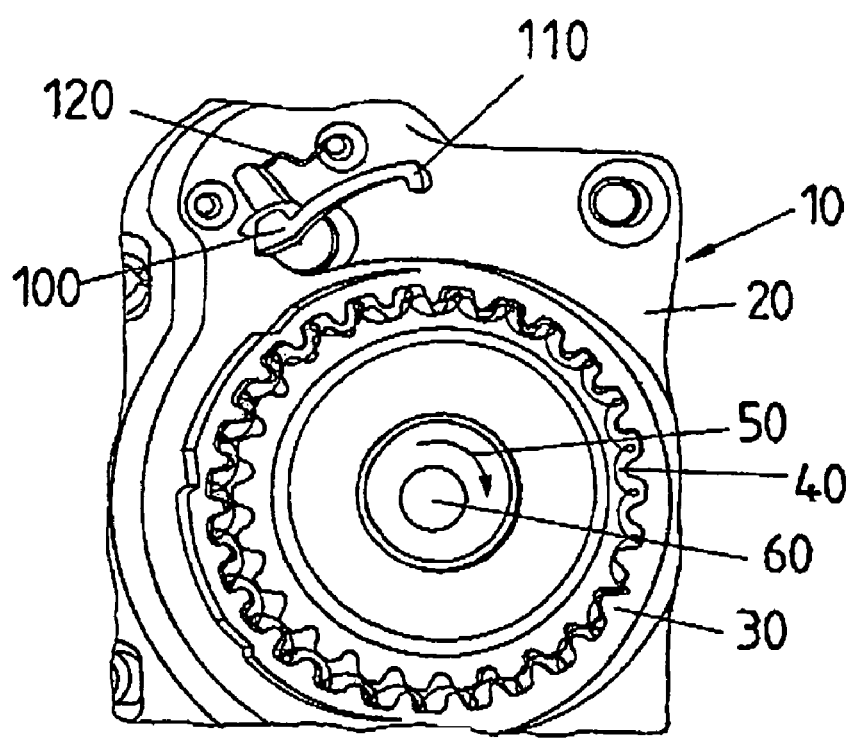
FIG. 1 is a side perspective view of an exemplary embodiment for a belt retractor.

Presently preferred embodiments of the invention are illustrated in the drawings. An effort has been made to use the same, or like, reference numbers throughout the drawings to refer to the same or like parts.

An exemplary embodiment for a belt retractor 10 according to the invention can be seen in FIG. 1. The belt retractor 10 has a housing 20 in which an inner toothed ring 30 is formed. The inner toothed ring 30 has a tooth number of $Z2=27$.

A cam disc 40 having a toothed edge is arranged in the inner toothed ring 30. The cam disc 40 has a tooth number of $Z=26$.

The cam disc 40 is driven directly by an eccentric disc 50 which rotates about an axis of rotation 60 of a belt reel (not illustrated in FIG. 1), specifically in a rotationally fixed manner together with the belt reel. The inner toothed ring 30 is arranged concentrically with respect to the axis of rotation 60 of the belt reel and, therefore, concentrically with respect to the belt reel.

The diameter of the cam disc 40 and the diameter of the inner toothed ring 30 are selected in such a manner that the cam disc 40 is in meshing engagement with the inner toothed ring 30 over a limited circumferential region in each case, and that the teeth of the cam disc 40 and those of the inner toothed ring 30 are at such a radial distance from one another diametrically opposite one another that the cam disc 40 rolls along the inner toothed ring 30 when the eccentric disc 50 is rotated about the axis of rotation 60.

The eccentric disc 50, the cam disc 40 and the inner toothed ring 30 form a wobble gear. The step-down ratio of the wobble gear is produced according to the following equation:

$$I = \frac{Z1}{Z2-Z1} = \frac{26}{27-26} = 26$$

In addition, a blocking pawl 100 which has a latching arm 110 can be seen in FIG. 1. Depending on the position of the blocking pawl 100, the latching arm 110 is in engagement with a toothed ratchet wheel (not illustrated in FIG. 1) which rotates at the same time as the belt reel of the belt retractor 10.

In this case, the simultaneous rotation of the toothed ratchet wheel can be achieved by the belt reel and the toothed ratchet wheel being connected to each other in a rotationally fixed manner; in this case, the blocking pawl would be load-bearing in the blocking position.

As an alternative, the simultaneous rotation of the tooth ratchet wheel may also be achieved by the toothed ratchet wheel and the belt reel being connected resiliently; in the case of a resilient connection, a rotation of the belt reel and of the toothed ratchet wheel relative to each other is possible. In this alternative case, although the toothed ratchet wheel would be blocked (by the blocking pawl 100 being in the blocking position) the belt reel would not. As a result, the belt reel would be able to continue to rotate owing to the resilient position, thus resulting in a differential angle between the toothed ratchet wheel and the belt reel. If such an angle error should occur, then (by means of corresponding slotted-guide or slotted-switch mechanisms) the retractor blocking pawl of the belt retractor can be activated and can then lock the belt reel in a load-bearing manner. In this alternative configuration of the simultaneous rotation of the toothed ratchet wheel, the blocking pawl is, therefore, not load-bearing, but rather merely executes the function of a switching arm (also called a "release arm") by means of which the retractor blocking pawl of the belt retractor is activated.

As can be seen in addition in FIG. 1, the blocking pawl 100 is kept in its particular position by a spring 120. The blocking pawl 100 can be switched by switching cams of the cam disc 40, as will be later explained in detail.

Figure 2:
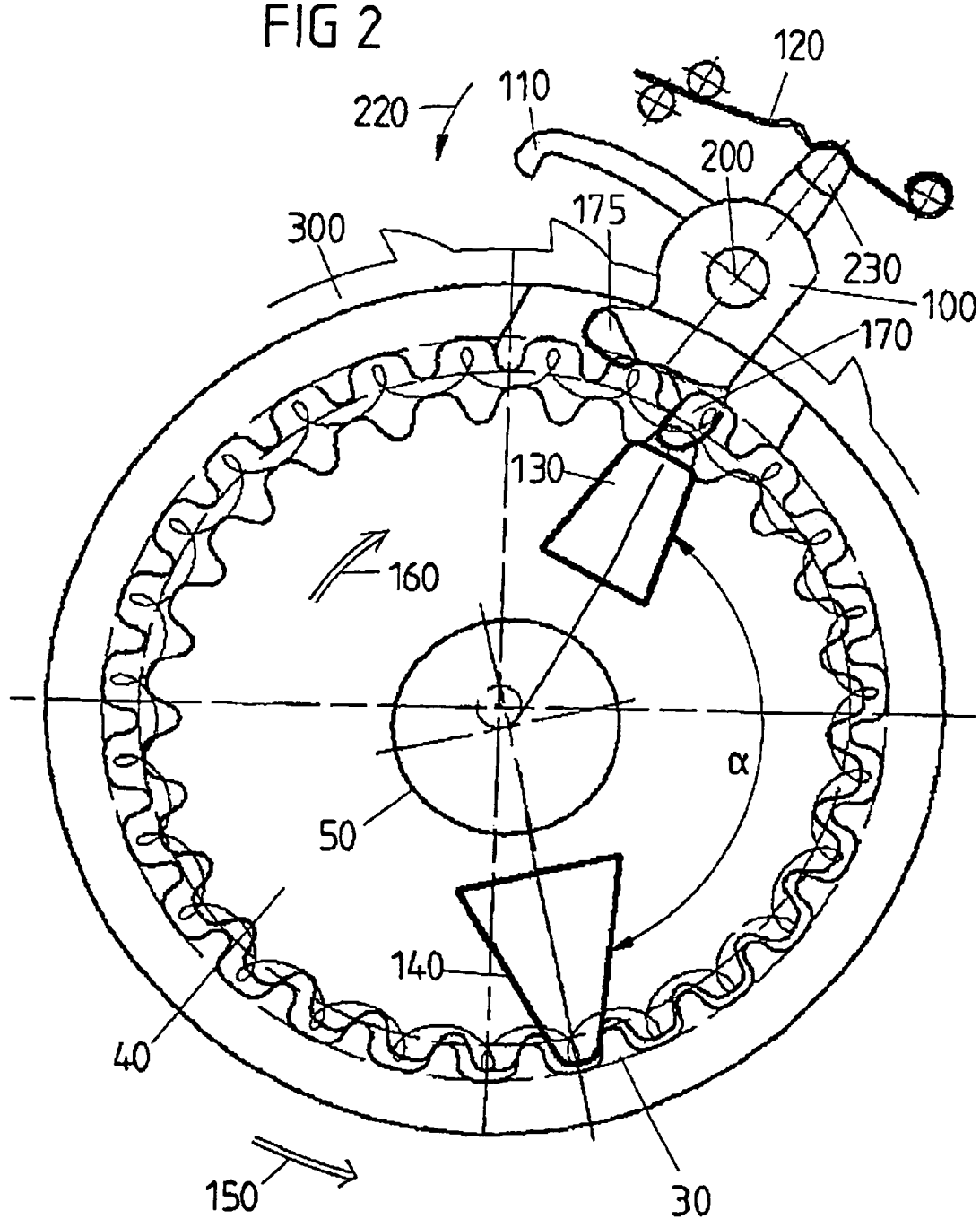

An illustration of the detail of the belt retractor 10 according to FIG. 1 can be seen in FIG. 2 which shows the interaction of the blocking pawl 100 with the cam disc 40. FIG. 2 illustrates that the cam disc 40 has two switching cams, namely an engaging cam 130 and a disengaging cam 140. With the engaging cam 130 and the disengaging cam 140, the blocking pawl 100 can be switched as follows:

If the belt strap is pulled out of the belt retractor 10, then the belt reel of the belt retractor 10 rotates along the direction of the arrow 150. As the eccentric disc 50 is connected in a rotationally fixed manner to the belt reel, the eccentric disc 50 correspondingly rotates at the same time and correspondingly deflects the cam disc 40. Owing to this deflection of the cam disc 40, the cam disc 40 rolls along the inner toothed ring 30 and rotates along the arrow direction 160, i.e., in an opposed manner to the direction of rotation of the eccentric disc 50. Owing to this rotation of the cam disc 40, the engaging cam 130 is moved towards an engaging lever 170 of the blocking pawl 100. As soon as the engaging cam 130 strikes against the engaging lever 170, the blocking pawl 100 is rotated about its axis of rotation 200, so that the latching arm 110 of the blocking pawl 100 is moved downwards along the arrow direction 220.

Moreover, the disengaging lever 175, which is not grasped by the engaging cam 130, can be seen in FIG. 2.

Figure 3:
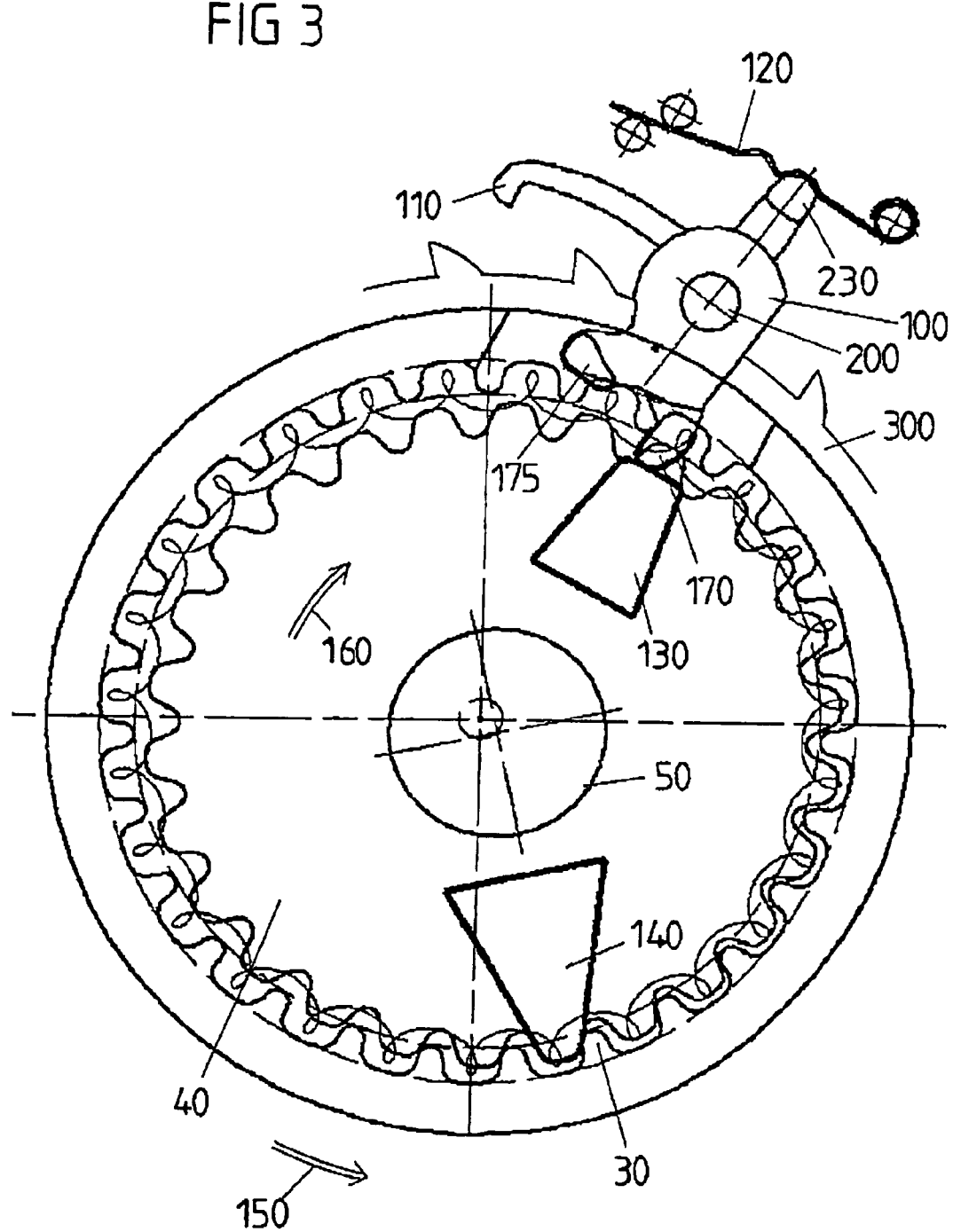
Figure 4:
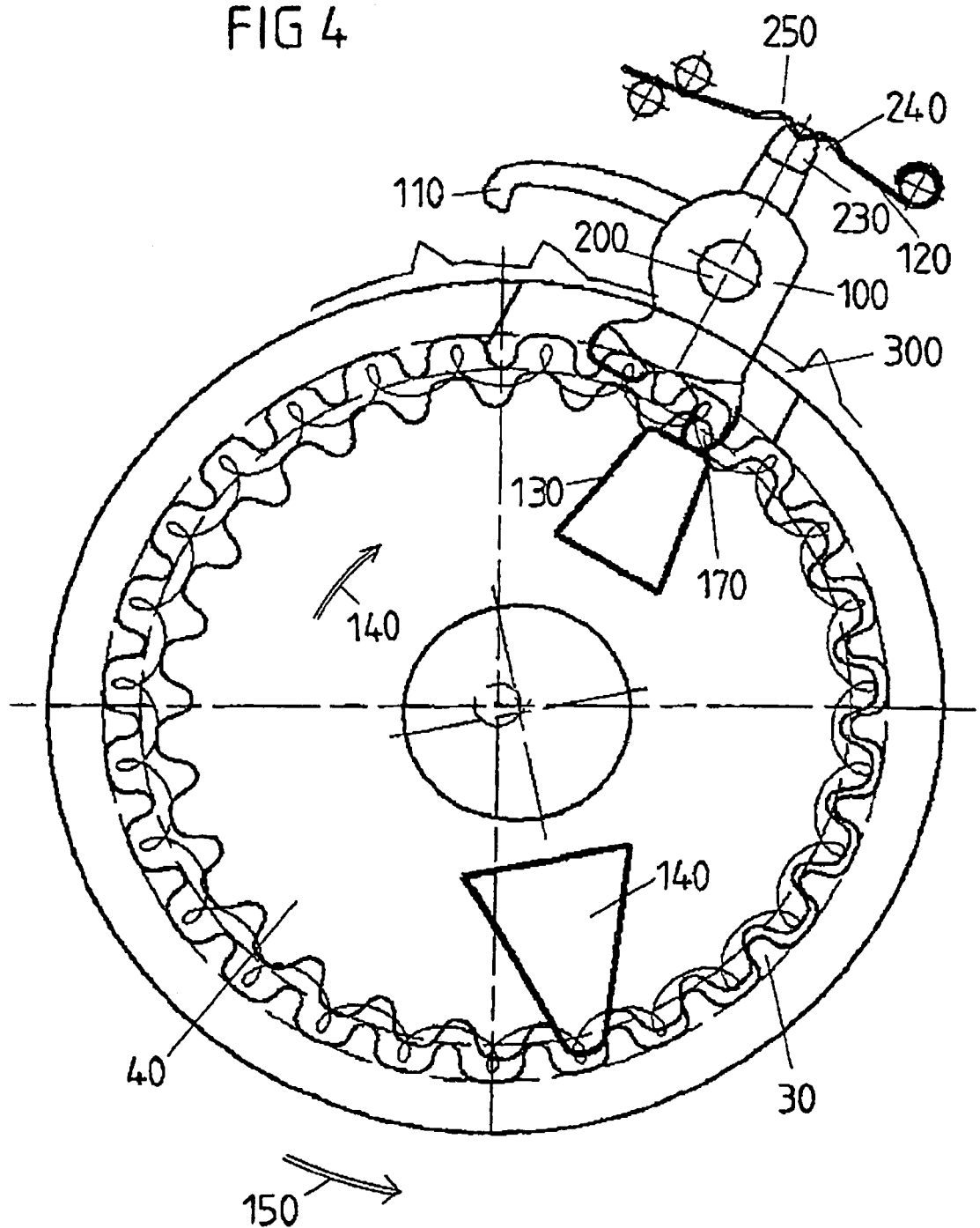

The precise sequence of movement of the blocking pawl 100 and of the engaging cam 130 can be gathered from FIGS. 2–4 by the time history. Specifically, it can seen in FIG. 4 that the engaging cam 130 has deflected the blocking pawl 100 in such a manner that a latching lug 230 of the blocking pawl 100 has moved out of a first recess 240 of the spring 120. The latching lug 230 of the blocking pawl 100 is specifically situated between the first recess 240 and a second recess 250 of the spring 120.

As can also be gathered from FIGS. 2–4, the first recess 240 of the spring 120 is used for the purpose of fixing the blocking pawl 100 in a release position in which the latching arm 110 of the blocking pawl 100 is disengaged from the toothed ratchet wheel 300 of the belt retractor 10. However, the switching state (as shown in FIG. 4) is not stable because, namely (owing to the spring force of the spring 120) the latching lug 230 tries to spring or will spring either into the first recess 240 or into the second recess 250 of the spring 120.

Owing to the deflection of the engaging lever 170 by the engaging cam 130, the latching lug 230 will spring into the second recess 250 of the spring 120. This springing of the latching lug 230 into the second recess 250 of the spring 120 is shown in detail in FIG. 5. It can be seen that the blocking pawl 100 has rotated through approximately 20° about its axis of rotation 200, so that the latching arm 110 is now in engagement with the toothed ratchet wheel 300. Otherwise, however, the length of the engaging lever 170 and the length of the disengaging lever 175 are selected in such a manner that the latching lug 230 is always guided beyond the dead-center position shown in FIG. 4, i.e., independently of the spring action of the spring 120.

The latching arm 110 now prevents the toothed ratchet wheel 300 from being able to be rotated along the arrow direction 310 (belt pull-out direction); owing to the latching arm 110 having been latched in place. As a result, only a movement of the toothed ratchet wheel 300 along the arrow direction 320 (belt retraction direction) is possible. This means that the belt roller of the belt retractor 10 can likewise be rotated only along the direction of rotation 320, and the belt of the belt retractor 10 can only be retracted into the belt retractor and no longer be pulled out of the belt retractor.

As the belt spindle and, therefore, the eccentric disc 50 can likewise only rotate along the arrow direction 320, the cam disc 40 can only move along the arrow direction 310; as the cam disc 40 always rotates counter to the direction of rotation of the eccentric disc 50.

Figure 5:
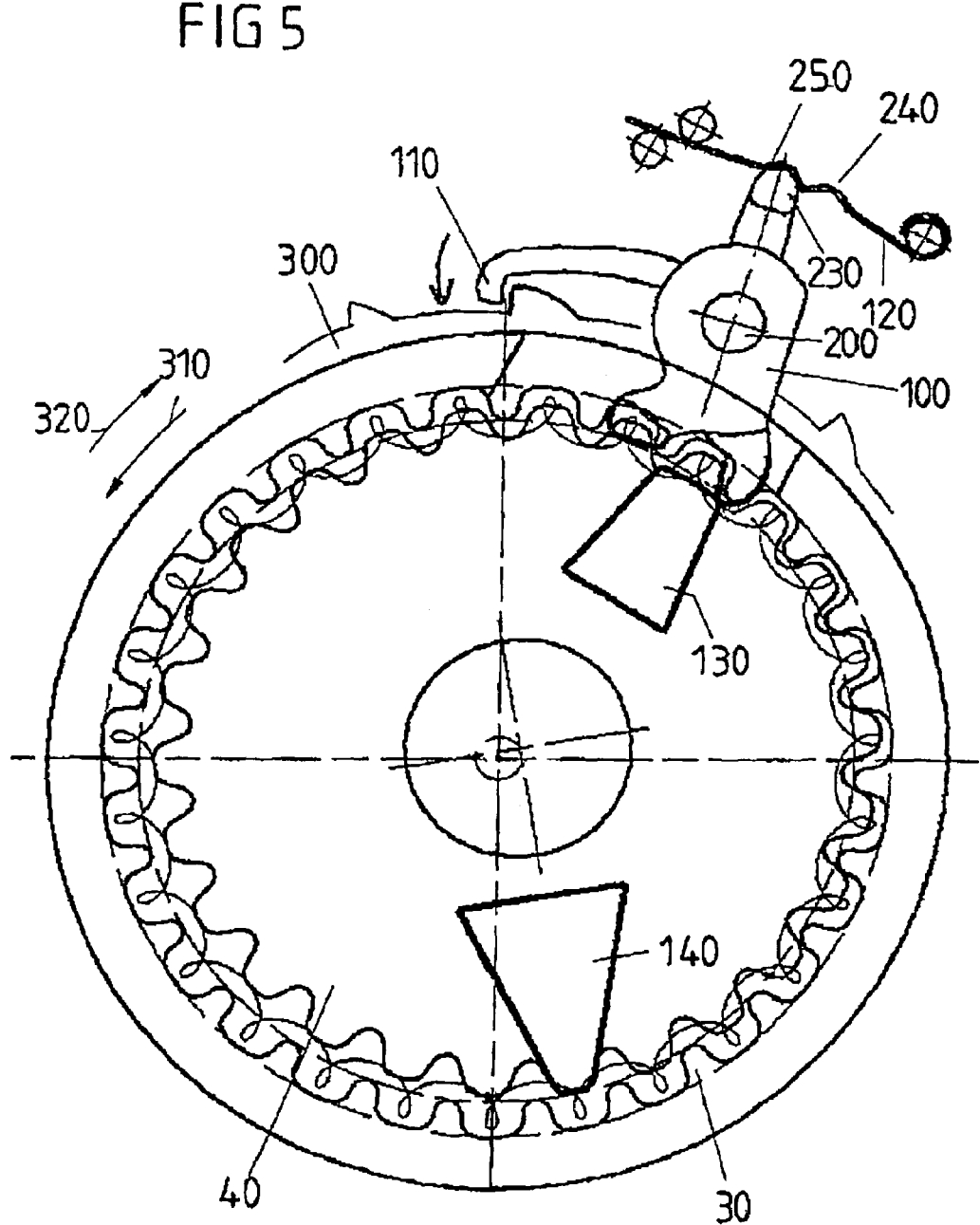
Figure 5A:
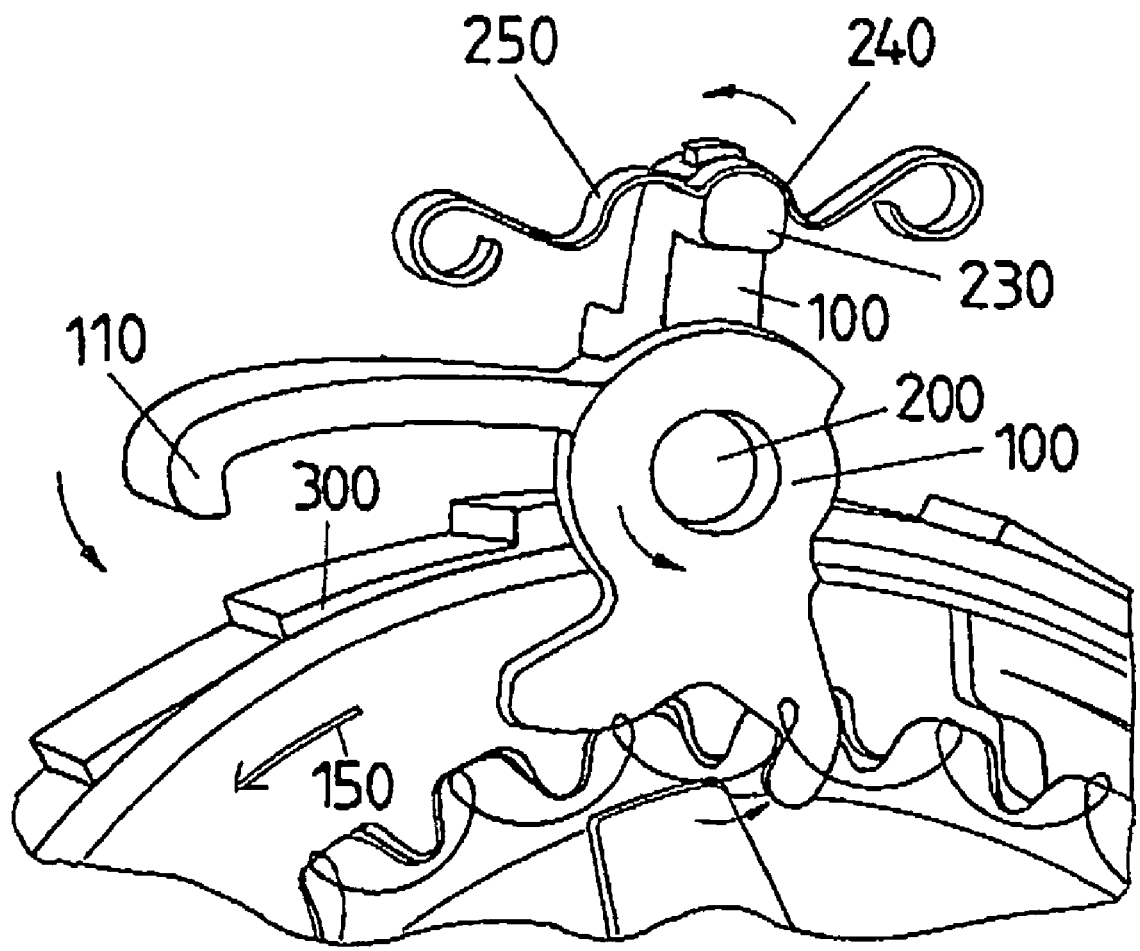
FIGS. 5A and 8A show an illustration of the detail of the switching of the blocking pawl.

The switching of the blocking pawl 100 from the release position to the blocking position according to FIG. 5 is shown again in more detail in FIG. 5A, in a three-dimensional illustration.

It can be seen in FIGS. 5 and 6 that, when the cam disc 40 is rotated along the direction of rotation 310, the engaging cam 130 is guided for a second time past the blocking pawl 100. However, it is ensured that, when this engaging cam 130 is guided past the blocking 100, a deactivation of the blocking pawl 100 (or a rotating away of the latching arm 110 from the toothed ratchet wheel 300) cannot occur.

This is specifically achieved in the case of the belt retractor 10 by the fact that the engaging lever 170 is configured and arranged in such a manner that it can no longer be grasped by the engaging cam 130 in the blocking position of the blocking pawl 100, which position is illustrated in FIGS. 5 and 6. After the engagement of the blocking pawl, the engaging cam 130 is, therefore, guided past the engaging lever 170, without the blocking pawl 100 being able to be reset.

In addition, the blocking pawl 100 is configured in such a manner that the disengaging lever 175 of the blocking pawl 100 also cannot be grasped by the engaging cam 130. This ensures that when the engaging cam 130 is rotated back past the blocking pawl 100, a deactivation of the blocking pawl 100 cannot occur and that therefore the latching arm 110 of the blocking pawl 100 remains in engagement with the toothed ratchet wheel 300.

In summary, it can be ascertained that, after the blocking position of the blocking pawl 100 is engaged or after the blocking pawl 100 is activated, the engaging cam 130 can no longer result in the blocking pawl being switched or deactivated. The seat belt of the belt retractor 100 can, therefore, readily slide back into the belt retractor without a deactivation of the blocking pawl 100 occurring.

FIGS. 7–10 show the deactivation or switching of the blocking pawl 100 from its blocking position into its release position. The manner in which the disengaging cam 140 is guided past the engaging lever 170 of the blocking pawl 100 and enters into engagement with the disengaging lever 175 of the blocking pawl 100 can be seen. In this case (as can be gathered in particular from FIG. 8) the blocking pawl 100 is caused to rotate about its axis of rotation 200, so that the latching arm 110 can rotate along the arrow direction 400. In the process, the latching lug 230 of the blocking pawl 100 passes from the second recess 250 of the spring 120 back into the first recess 240 of the spring 120.

Figure 8A:
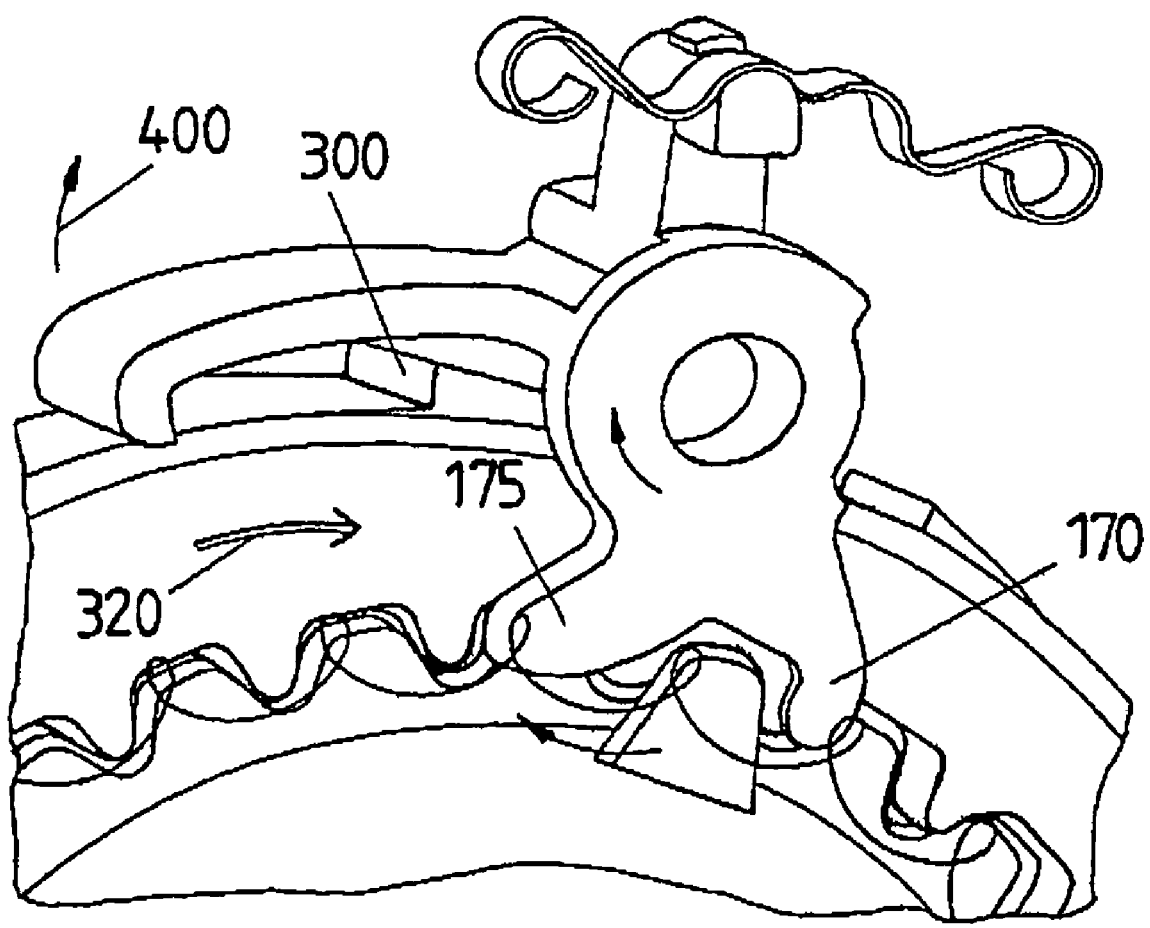

The rotation of the latching arm 10 means that the latter is now disengaged from the toothed ratchet wheel 300, so that the toothed ratchet wheel 300 and, therefore, the belt reel of the belt retractor 10 can now rotate in both directions of rotation (indicated by the double arrow 400 in FIG. 8). After the blocking pawl has been deactivated, the belt retractor can, therefore, be retracted and pulled out as desired, as is desirable in normal operation, i.e., the ELR mode. The switching of the blocking pawl 100 into the release position is additionally also shown in a three-dimensional illustration in FIG. 8A.

The latching arm 110 of the blocking pawl 100 is moreover configured in such a manner that a loud, easily audible "click" noise occurs if (in the blocking position of the blocking pawl 100) the toothed ratchet wheel is rotated in the belt winding-up direction. The click noise is caused by the fact that on the sloping flank of each ratchet tooth of the toothed ratchet wheel 300, the spring force of the spring 120 causes the latching arm 110 to be accelerated in the direction of the toothed ratchet wheel 300 and to strike audibly on the latter.

To ensure that the disengaging cam 140 cannot unintentionally reactivate the blocking pawl 100, the disengaging cam 140 is arranged in such a manner that it can no longer deflect the engaging lever 170 of the blocking pawl 100, after switching has occurred. The disengaging cam 140 is, therefore, guided past the engaging lever 170 of the blocking pawl 100, without the blocking pawl 100 being activated.

Figure 11A:
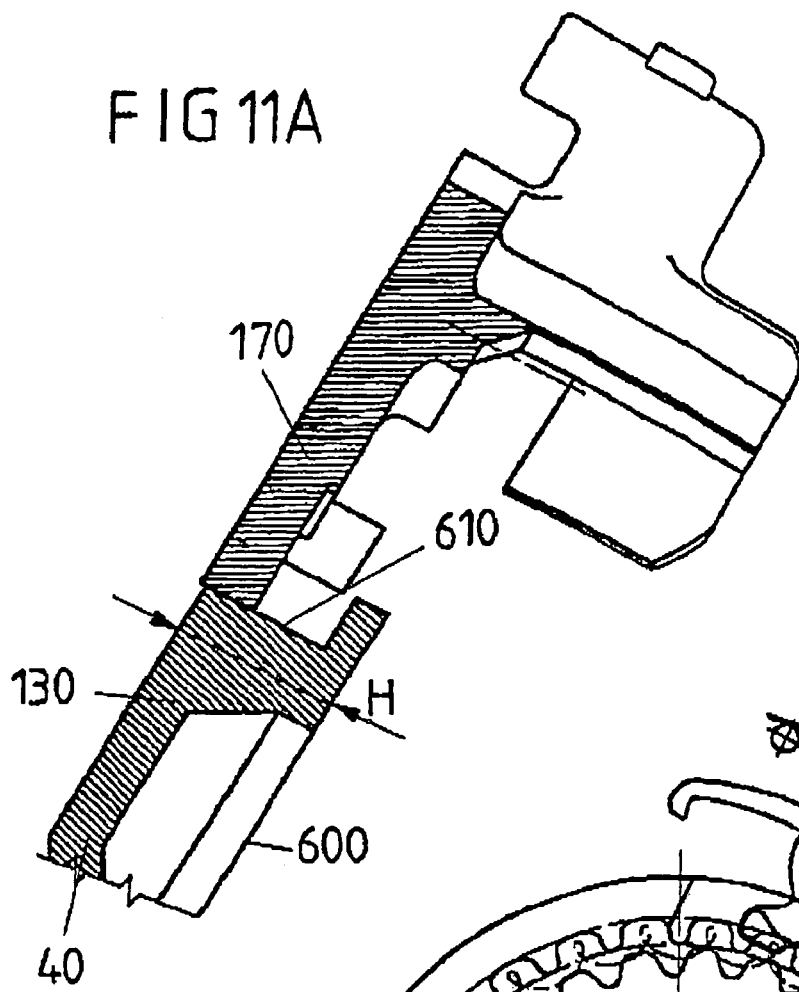
Figure 11B:
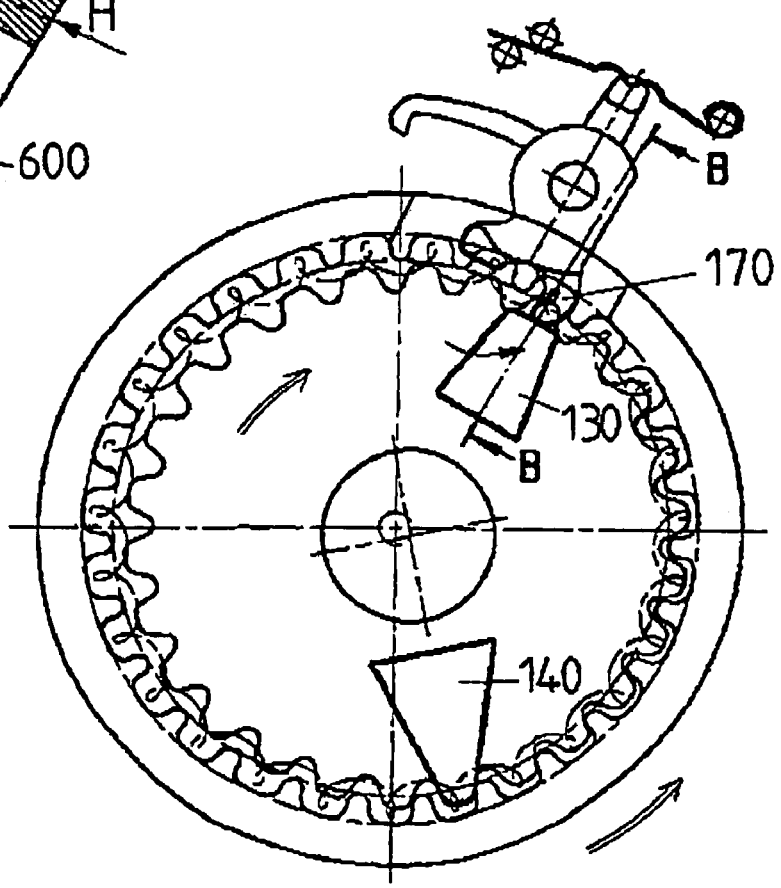

FIGS. 11A and 11B illustrate a manner in which the engaging lever 170 of the blocking pawl 100 and the engaging cam 130 are configured to ensure that the engaging lever 170 can be deflected by the engaging cam 130. It can be seen that the engaging cam 130 is raised with respect to the basic surface 600 of the cam disc 40 and has a height H. The height H is dimensioned in such a manner that the active end or switching surface 610 of the engaging cam 130 can enter into contact with the engaging lever 170 of the blocking pawl 100 and can deflect the latter. This entering into contact of the engaging cam 130 with the engaging lever 170 is shown once again in plan view in FIG. 11B.

The manner in which the disengaging lever 175 is configured can be seen in FIGS. 12A and 12B. It can be seen that the disengaging lever 175 is too short for it to be able to be grasped by the engaging cam 130, specifically irrespective of the position in which the blocking pawl 100 is in. Between the active end surface (switching surface) 610 of the engaging cam 130 and the disengaging lever 175 there is, therefore, always a distance (indicated by the reference symbol "a") which is marked in FIG. 12A.

Figure 13A:
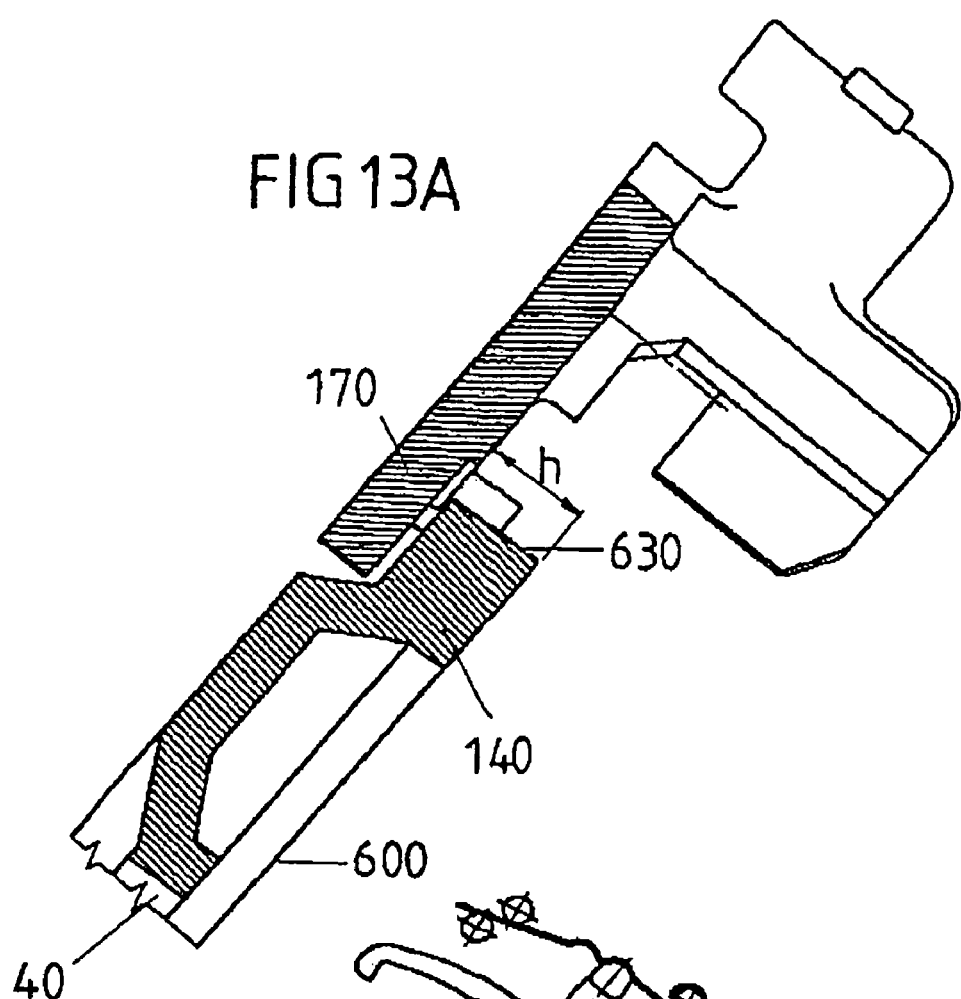
Figure 13B:
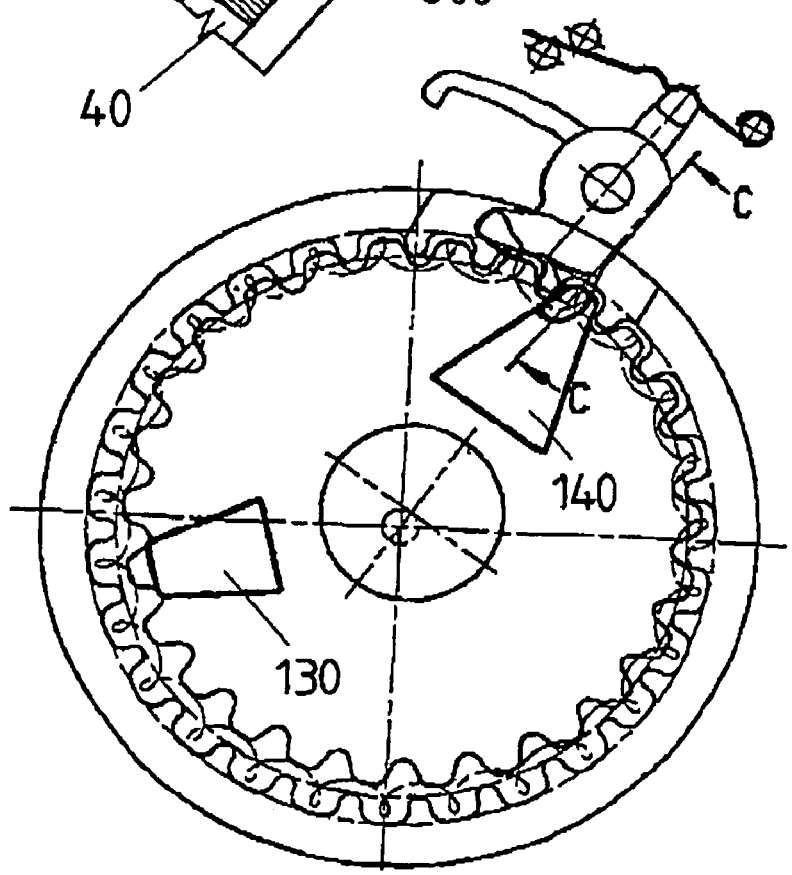

FIGS. 13A and 13B illustrate the dimensioning of the disengaging cam 140. It can be seen that the disengaging cam 140 has a height h which is dimensioned in such a manner that the disengaging cam 140 cannot come into contact with the engaging lever 170 of the blocking pawl 100. Specifically, the engaging lever 170 is arranged in such a manner that the disengaging cam 140 is guided below the engaging lever 170. This guiding of the disengaging cam 140 past the engaging lever 170 is shown in detail in FIG. 13B.

In addition, it can be seen in FIG. 13A that the disengaging cam 140 extends in the direction of the blocking pawl in such a manner that the latter is at a greater distance from the center point of the cam disc than the engaging cam 130. Specifically, the switching surface 630 of the disengaging cam 140, which surface is situated at the outer end of the disengaging cam 140, is at a greater distance from the center point of the cam disc than the switching surface 610 of the engaging cam 130. In contrast with the engaging cam 130, the disengaging cam 140 can, therefore, actuate the disengaging lever 175; this is because the active switching surface 630 of the disengaging cam 140 can grasp the disengaging lever 175 (FIGS. 14A and 14B).

In summary, it can, therefore, be ascertained that, owing to the presence of the engaging cam 130 and the disengaging cam 140, it is ensured that no unintentional disengaging or deactivating of the blocking pawl 100 and no unintentional engaging or activating of the blocking pawl 100 can occur. Such an unintentional switching of the blocking pawl 100 is avoided by the engaging cam 130 and the disengaging cam 140 being arranged spaced apart from each other on the cam disc 40.

As can be gathered in particular from FIG. 2, the engaging cam 130 and the disengaging cam 140 are at an angle $\alpha$ with respect to each other. This angle $\alpha$ is selected in such a manner that the revolving speed of the belt reel required to rotate the cam disc 40 about this angle corresponds, depending on the vehicle specification, to the length of the seat belt wound on the belt reel. In other words, the belt retractor can be adapted to different vehicle specifications by the fact that the angle $\alpha$ is correspondingly adapted; specifically, the switching points of the cam disc can be set by stipulation of the angle $\alpha$ and, therefore, by a corresponding arrangement of the switching cams, without the gear or the step-down ratio of the gear having to be modified. Moreover, it is not important whether the length of the seat belt is matched exactly to the angle $\alpha$ between the engaging cam 130 and the disengaging cam 140, as the blocking pawl 100 is namely exclusively activated by the engaging cam 130 and exclusively deactivated by the disengaging cam 140.

The priority application, German Patent Application 103 10 020, filed Feb. 28, 2003 is incorporated herein by reference in its entirety.

Although the aforementioned describes embodiments of the invention, the invention is not so restricted. It will be apparent to those skilled in the art that various modifications and variations can be made to the disclosed embodiments of the present invention without departing from the scope or spirit of the invention. Accordingly, these other belt retractors and associated methods of use are fully within the scope of the claimed invention. Therefore, it should be understood that the apparatuses and methods described herein are illustrative only and are not limiting upon the scope of the invention, which is indicated by the following claims.

What is claimed is:

1. A retractor for a seat belt comprising:
   a belt reel and an eccentric disc fixed to the belt reel such that the eccentric disc rotates with the belt reel;
   a cam disc driven directly by the eccentric disc and including an engaging cam and a disengaging cam arranged separately from the engaging cam;
   a toothed ratchet wheel configured to rotate at the same time as the belt reel in a pull-out direction of the seat belt; and
   a blocking pawl which, in a blocking position, blocks rotation of the toothed ratchet wheel and which, in a release position, leaves the toothed ratchet wheel unaffected,
   wherein the blocking pawl is configured to be switched from the release position into the blocking position and vice versa by the cam disc, wherein the engaging cam of the cam disc is configured to engage the blocking pawl to move it to the blocking position, and wherein the disengaging cam of the cam disc is configured to engage the blocking pawl to move it to the release position.

2. The retractor of claim 1, wherein the blocking pawl comprises an engaging lever which interacts exclusively with the engaging cam and a disengaging lever which interacts exclusively with the disengaging cam.

3. The retractor of claim 2, wherein the engaging lever is configured so that the engaging lever cannot be touched by the disengaging cam, deflected by the disengaging cam, or a combination of touched and deflected by the disengaging cam, and wherein the disengaging lever of the blocking pawl is dimensioned and arranged in such a manner that the disengaging lever cannot be touched by the engaging cam, deflected by the engaging cam, or a combination of touched and deflected by the engaging cam.

4. The retractor of claim 3, wherein one of the two cams of the cam disc has an active switching surface which is at a greater distance from a center point of the cam disc than an active switching surface of the other cam of the cam disc.

5. The retractor of claim 3, wherein the disengaging cam and the engaging cam each have a height above a basic flat surface of the cam disc.

6. The retractor of claim 5, wherein the height of one of the two cams of the cam disc is higher than the height of the other of the two cams of the cam disc.

7. The retractor of claim 1, wherein the blocking pawl is mounted rotatably about an axis of rotation.

8. The retractor of claim 7, wherein the belt retractor further comprises a housing, and wherein the axis of rotation is arranged on the housing of the belt retractor.

9. The retractor of claim 1, wherein the blocking pawl is locked in the blocking position or in the release position by a spring.

10. The retractor of claim 9, wherein the spring includes a metal spring.

11. The retractor of claim 9, wherein the spring includes a plastic spring.

12. The retractor of claim 11, wherein the belt retractor further comprises a housing, and wherein the spring includes a plastic element located on the housing of the retractor.

13. The retractor of claim 9, wherein the spring has two recesses, wherein one of the recesses fixes a latching lug of the blocking pawl in the blocking position, and wherein the other recess fixes the latching lug of the blocking pawl in the release position.

14. The retractor of claim 9, wherein when the blocking pawl is switched from the blocking position into the release position and conversely from the release position into the blocking position, the spring has to overcome a dead-center position.

15. The retractor of claim 1, wherein the belt retractor further comprises a housing, wherein the cam disc has an outer, toothed edge comprising teeth, wherein the teeth of the outer, toothed edge are surrounded by an inner toothed ring which is fixed on the housing, wherein the outer toothed edge is of larger diameter than the inner toothed ring and has complementary teeth, wherein the cam disc is in meshing engagement with the inner toothed ring over a limited circumferential region, and wherein teeth of the outer edge and inner ring are arranged at such a radial distance diametrically opposite each other that the cam disc rolls along the inner toothed ring when the belt reel of the belt retractor is rotated.

16. The retractor of claim 15, wherein the eccentric disc, the inner toothed ring, and the cam disc form a step-down gear.

17. The retractor of claim 16, wherein the cam disc has N teeth and the inner toothed ring has N +1 teeth.

18. The retractor of claim 17, wherein N =26.

19. The retractor of claim 15, wherein the eccentric disc, the inner toothed ring, and the cam disc form a wobble gear.

20. A retractor for a seat belt comprising:

a belt reel;

an eccentric disc connected to the belt reel;

a cam disc driven by the eccentric disc and including an engaging cam and a disengaging cam; and a blocking pawl configured to be placed in a blocking position and a release position so that when the blocking pawl is in the blocking position the blocking pawl blocks a toothed ratchet wheel which rotates at the same time as the belt reel in a belt pull-out direction of rotation of the seat belt, and when the blocking pawl is in the release position the rotation of the toothed ratchet wheel is unaffected, wherein the blocking pawl is configured to be switched from the release position into the blocking position and vice versa by the cam disc, wherein the engaging cam of the cam disc is configured to engage the blocking pawl to move it to the blocking position, and wherein the disengaging cam of the cam disc is configured to engage the blocking pawl to move it to the release position.

21. The retractor of claim 20, wherein the blocking pawl comprises an engaging lever which interacts exclusively with the engaging cam and a disengaging lever which interacts exclusively with the disengaging cam.

22. The retractor of claim 21, wherein the engaging lever is dimensioned and arranged in such a manner that the engaging lever cannot be touched by the disengaging cam, deflected by the disengaging cam, or a combination of touched and deflected by the disengaging cam, and wherein the disengaging lever of the blocking pawl is dimensioned and arranged in such a manner that the disengaging lever cannot be touched by the engaging cam, deflected by the engaging cam, or a combination of touched and deflected by the engaging cam.

23. The retractor of claim 20, wherein the blocking pawl is locked in the blocking position or in the release position by a spring.

24. The retractor of claim 23, wherein the spring has two recesses, wherein one of the recesses fixes a latching lug of the blocking pawl in the blocking position, and wherein the other recess fixes the latching lug of the blocking pawl in the release position.

* * * * *